United States Patent
Bremer

[11] Patent Number: 6,018,671
[45] Date of Patent: *Jan. 25, 2000

[54] SILENT CALL ACCEPT

[75] Inventor: Erik Christian Bremer, Glenview, Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/580,916

[22] Filed: Dec. 29, 1995

[51] Int. Cl.[7] .................................................. H04Q 7/32
[52] U.S. Cl. .................. 455/567; 455/567; 455/412; 455/564; 455/575; 340/825.44; 340/825.46; 379/37; 379/41; 379/164; 379/179
[58] Field of Search .................................. 379/37, 41, 164, 379/179, 215, 373; 455/403, 406, 413, 415, 422, 432, 567, 575, 90, 412, 564; 340/825.44, 825.46

[56] References Cited

U.S. PATENT DOCUMENTS

| | | | |
|---|---|---|---|
| 4,495,647 | 1/1985 | Burke et al. | 340/825.44 |
| 5,251,250 | 10/1993 | Obata et al. | 397/59 |
| 5,307,399 | 4/1994 | Dai et al. | 379/58 |
| 5,327,486 | 7/1994 | Wolff et al. | 379/58 |
| 5,381,465 | 1/1995 | Carter et al. | 379/67 |
| 5,388,150 | 2/1995 | Schneyer et al. | 379/67 |
| 5,396,544 | 3/1995 | Gilbert et al. | 379/67 |
| 5,400,393 | 3/1995 | Knuth et al. | 379/67 |
| 5,428,663 | 6/1995 | Grimes et al. | 379/58 |
| 5,640,441 | 6/1997 | Serrano et al. | 379/58 |
| 5,642,413 | 6/1997 | Little | 379/58 |
| 5,657,372 | 8/1997 | Ahlberg et al. | 455/567 |
| 5,668,862 | 9/1997 | Bannister et al. | 455/567 |
| 5,758,280 | 5/1998 | Kimura | 455/567 |
| 5,867,796 | 2/1999 | Inutsuka | 455/567 |

Primary Examiner—Wellington Chin
Assistant Examiner—Keith Ferguson
Attorney, Agent, or Firm—Randall S. Vaas

[57] ABSTRACT

A remote device (102) includes a silent alert allowing the device to signal the user of an incoming call without an audible alert. The device further includes a key (119) actuated by the user to accept the call into a nonactive state. A prerecorded message is generated from a memory (126) and played for the calling party to inform the caller that the user is occupied, but will answer the call shortly. According to one aspect of the invention, the message can be periodically repeated, until the user places the call in an active call state. According to another aspect of the invention, the user can interrupt the message and enter the active call state at any time during the silent answer and hold subroutine.

9 Claims, 3 Drawing Sheets

SILENT CALL ACCEPT

FIELD OF THE INVENTION

The present invention pertains to remote communication devices, such as radiotelephones, having a silent alert for an incoming call.

BACKGROUND OF THE INVENTION

Telephone devices, including land-line telephones and radiotelephones, include a transducer or bell providing an audible alert that is commonly known as "ringing". Some portable telephone devices, such as radiotelephones, include a vibrator that vibrates the device to provide a silent alert. In these devices, the user can select either the silent alert or the audible alert depending upon the user's needs.

The user of the device will typically select the silent alert while participating in a meeting or otherwise located in a public where the audible alert will cause a disruption. The advantage of the silent alert is that it lets the user know of an incoming call without disturbing others. However, if the user answers the incoming call immediately, they will disturb others. Other alternatives available to the user include ignoring the call, which will result in losing the call, or accepting the call immediately and not speaking into the device until moving to a private location. If the user accepts the call, but does not speak right away, the calling party will be confused and they will likely hang-up and try to call again.

One advantageous solution has been to put an answering circuit into portable radiotelephone devices. The answering circuit stores a prerecorded message requesting that the caller leave a short reply, and records the reply for later play-back by the user. Although the answering circuit permits recording of the message, the circuit is relatively large and expensive and does not provide a reliable message of the called party's status. Thus the calling party does not know when the called party will call back.

Accordingly, it is desirable to provide an improved, more versatile, silent answer feature.

DETAILED DESCRIPTION OF THE PREFERRED EMBODIMENTS

Figure 1:
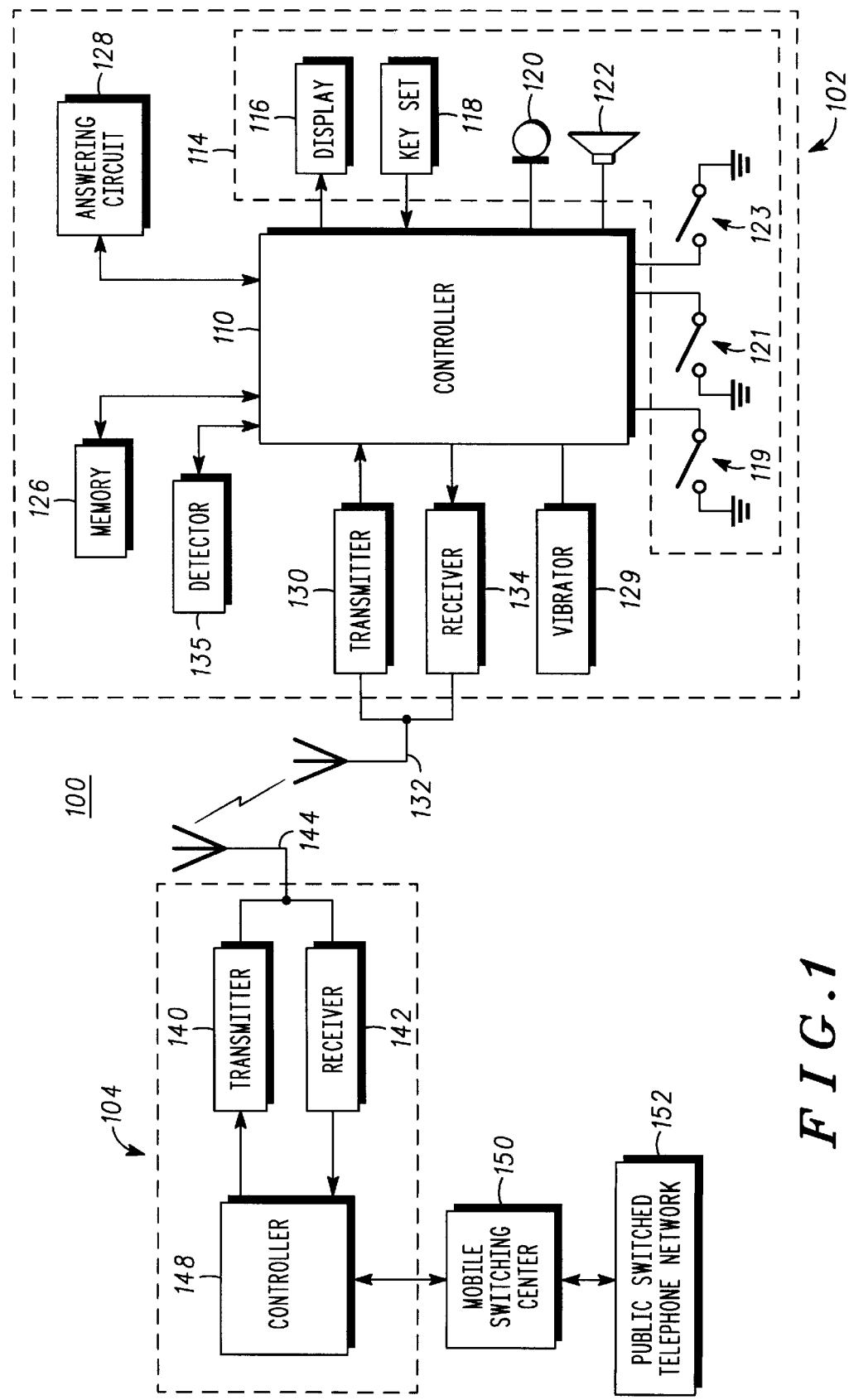
FIG. 1 is a circuit diagram in block diagram form illustrating a radio frequency (RF) communication system.

A remote device 102 (FIG. 1) includes a silent alert allowing the remote device 102 to signal the user of an incoming call without an audible alert. The remote device 102 further includes a key 119 actuated by the user to put the caller on hold. A prerecorded message is generated for the calling party to inform the caller that the user is occupied, but will answer the call shortly. According to one aspect of the invention, the message can be periodically repeated, until the user places the call in an active call state. According to another aspect of the invention, the user can interrupt the message and enter the active call state at any time during the silent answer and hold subroutine. The answer and hold feature allows the user to inform a calling party that the user will respond to the alert shortly, giving the user time to move to a private location or an environment more conducive to telephone conversation, before having to speak to the calling party.

The remote device 102 includes a controller 110 connected to a user interface 114. The user interface 114 includes a display 116, a key set 118, and three additional keys, 119, 121, and 123, connected to controller 110. The remote device 102 can be a cellular radiotelephone, a cordless radiotelephone, or any other portable device that communicates with another device in a telephone-like manner, and "remote device" as used herein refers to each of these and their equivalents.

The key set 118 is implemented using any suitable means, such as a push-button keypad, a touch screen, or the like. Keys 119, 121, and 123 are push-button keys, which may be implemented using any suitable commercially available means which closes a contact when pressed and opens the contact when released. Keys 121 and 123 are volume-up and volume-down keys, respectively. Key 119 is a silent answer key. The display 116 is implemented using a suitable commercially available apparatus, such as liquid crystal display (LCD), a light emitting diode (LED) display, or the like. The controller 110 is implemented using one or more suitable microcontrollers, digital signal processors, or microprocessors, such as a Motorola HC-11 microprocessor. The user interface also includes conventional microphone 120 and speaker 122 connected to controller 110. A memory 126 storing messages and an answering circuit 128 are also connected to the controller 110. The answering circuit is any suitable commercially available circuit implementing answering machine functions such as playing a recorded message and recording a caller's response to the recorded message. A vibrator 129, which is a silent alert generator connected to controller 110. The vibrator can be implemented using a motor (not shown) which drives a weight (not shown) to rotate thereby creating a vibration; a transducer, or any other suitable means.

The remote device 102 transceiver includes a transmitter 130 and a receiver 134. The controller 110 outputs signals to transmitter 130, which modulates the signals for transmission via antenna 132. The signals output to the transmitter include control signals, signals detected by microphone 120, or any other signal for communication to central device 104. Signals detected by antenna 132 are demodulated by receiver 134, and the resulting signal is input to controller 110. Controller 110 outputs these signals to the speaker 122 or uses this signal in its control processes.

The central device 104 includes a transceiver comprising a transmitter 140 and a receiver 142 connected to an antenna 144. A controller 148 receives demodulated signals output by receiver 142 and inputs signals to transmitter 140, which modulates the signals for transmission through antenna 144. The controller is coupled to a mobile switching center 150, which connects to a public switched telephone network 152. Although the illustrated central device is a cellular base station, the central device can be a cordless telephone base or any other device that communicates with a remote device to provide telephone-like communication, and as used herein, "central device" refers to each of these or their equivalents.

Figure 3:
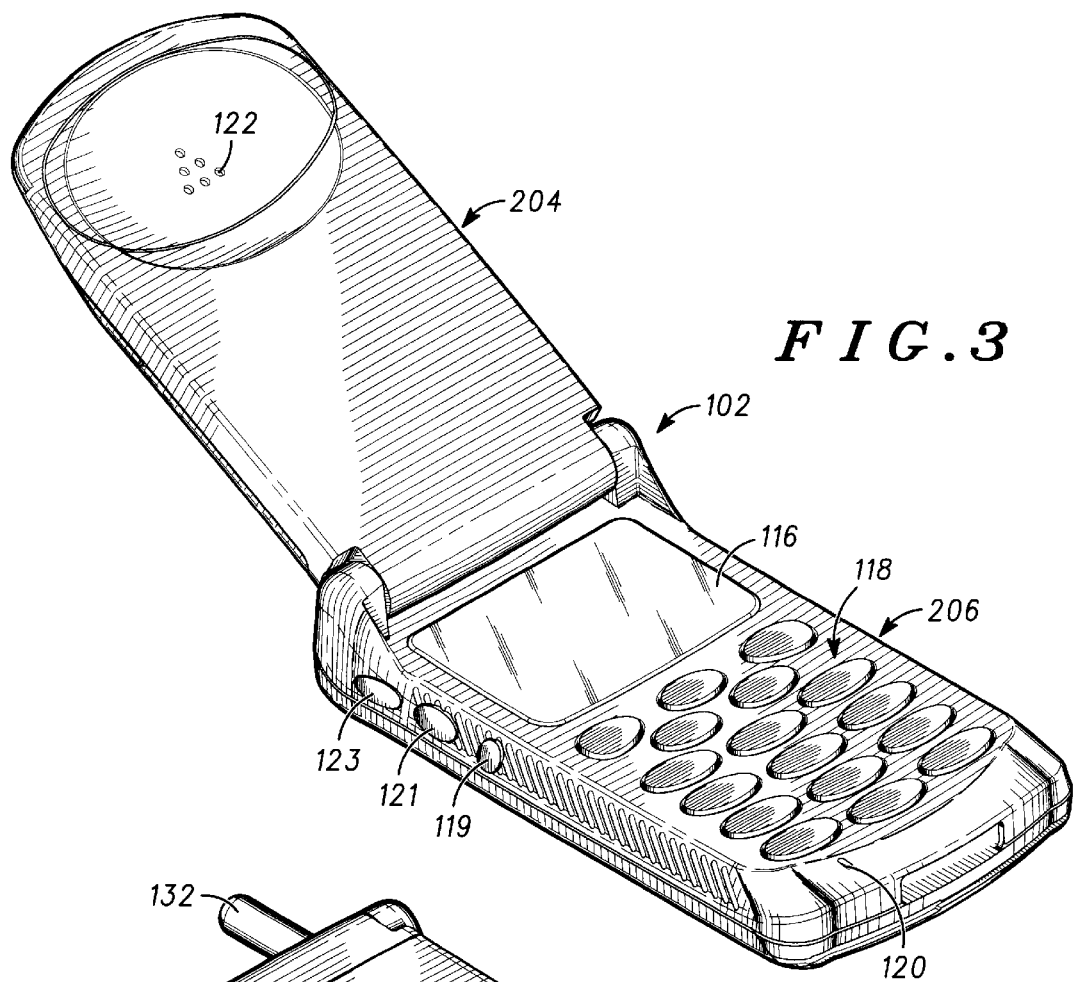
FIG. 3 is a top perspective view of the radiotelephone according to FIG. 2 in an open position.
Figure 2:
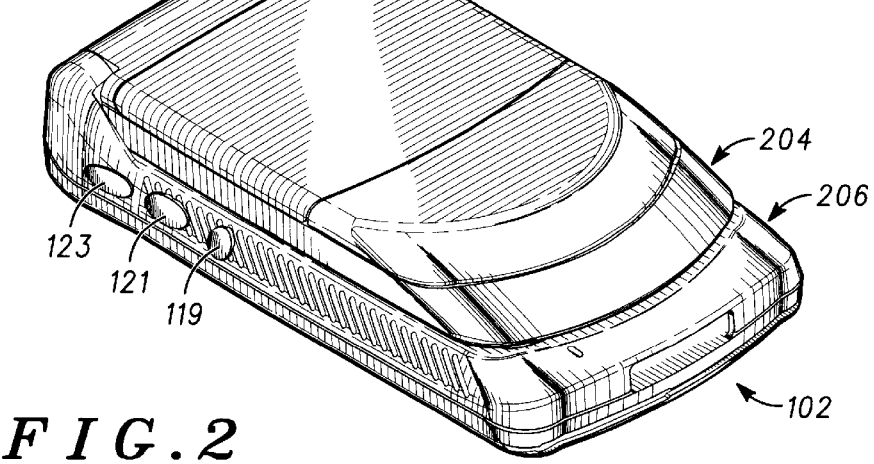
FIG. 2 is a top perspective view of a radiotelephone that can be used the RF system of FIG. 1 in a closed position.

A radiotelephone 200, which is one type of remote device, is illustrated in FIGS. 2 and 3 in the open and closed positions, respectively. The radiotelephone 200 includes a housing 202 having two housing sections 204 and 206 that are movingly interconnected. Section 206 includes silent answer key 119 on a side wall 214 such that the key is accessible when the housing is open and when it is closed. This allows the user to actuate the silent answer key 119 when the remote device 102 is closed without opening the housing.

Figure 4:
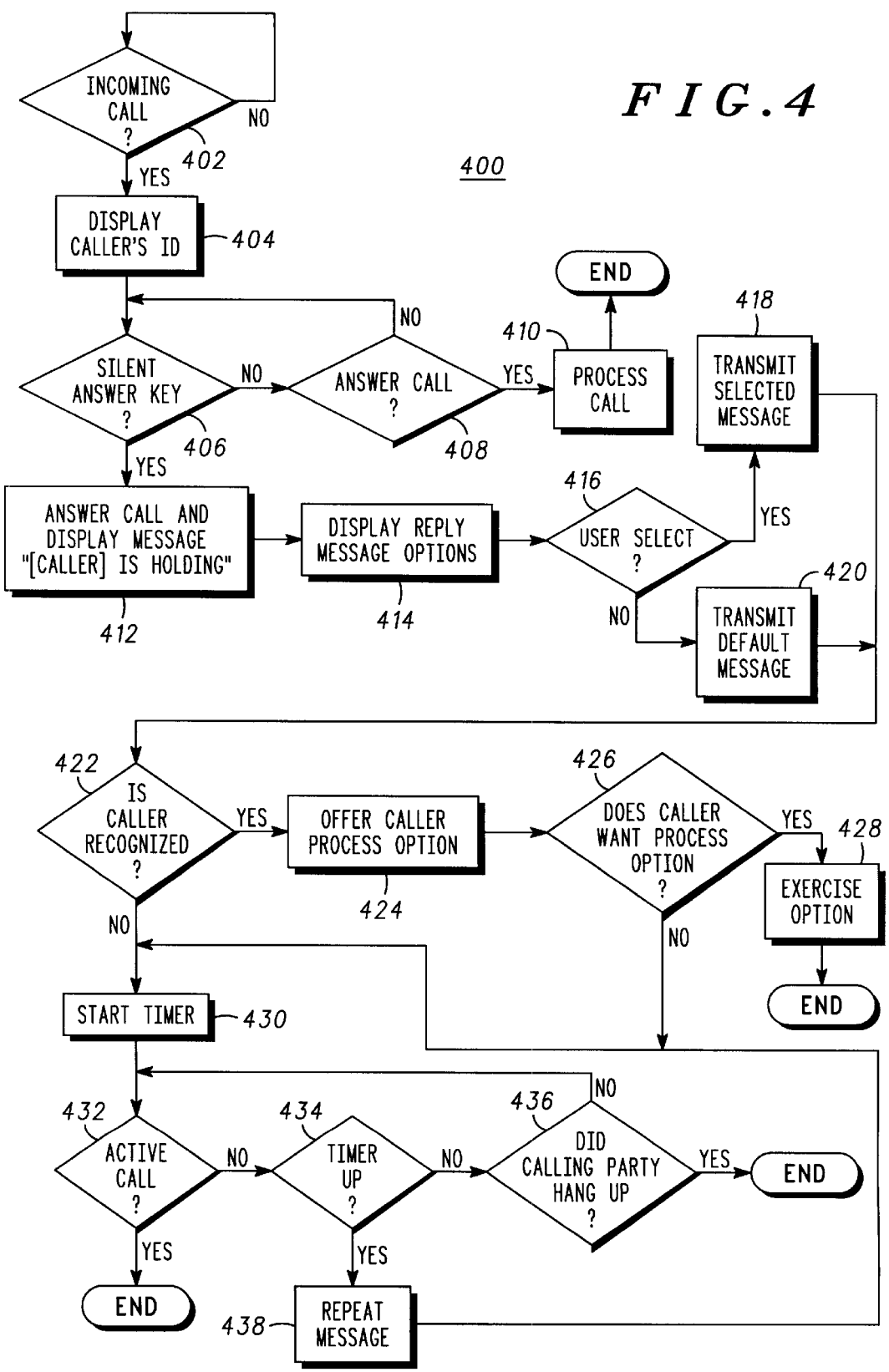
FIG. 4 is a flow chart illustrating operation of a device including silent answer.

In operation, the controller 110 detects an incoming call in decision block 402 (FIG. 4) to initiate the interrupt subroutine 400. The controller 110 controls the display 116 to display the caller's identification (ID), if it is available, as indicated in block 404. The controller 110 then waits for the user, the user being the operator of the portable device who is the called party, to actuate the silent answer key 119, as indicated in decision block 406. If the user does not actuate the silent answer key 119, but answers the call, as detected at decision block 408, the controller 110 proceeds to process the call, as indicated in block 410, and the subroutine ends.

It is envisioned that the answer call decision block 408 can be omitted, as the controller 110 can have an answer call subroutine (not shown) that ends the silent answer subroutine 400 at any time upon the user placing the remote device 102 in an active call state. In the active call state the microphone 120 and speaker 122 are in full communication with the central device 104, such that sounds detected by the microphone 120 are transmitted to the central device 104 and incoming audio signals are output by the speaker 122. Accepting the call into an active communication state will thus interrupt the silent answer subroutine 400 at any point in subroutine 400. The user accepts the call into an active call state upon generating a signal to controller 110 by: opening the housing sections 204, 206 if the device is closed; or actuating the silent answer key a second time after accepting the call into a nonactive call state; or by actuating a control key (not specifically shown) on the radiotelephone key set 118 at any time. If the remote device does not have folding housing sections, the silent answer key 119 or one of the keys in key set 118 is manually actuated to generate a signal to the controller 110 indicating the user wants to enter an active call state to converse with the caller.

Responsive to actuation of the silent answer key 119, the controller 110 accepts the call, placing the remote device 102 into a nonactive call state, as indicated in block 412. In the nonactive call state, the microphone 120 and speaker 122 are not in communication with the transmitter 130 and receiver 134. Manual actuation of the silent answer key 119 thus puts the remote device 102 in a state where signals detected by the microphone 120 are not transmitted to the central device 104 and audio signals incoming from central device are not communicated to the speaker 122. If the caller's name or number are known, and the remote device 102 has a display, the caller's name or number is displayed. The controller 110 thus optionally controls the display 116 to generate a message such as "[caller] is holding", in block 412. If the caller is not known, a default message such as "unknown caller" is displayed. The actual message displayed will depend upon the display of the remote device and the desires of the programmer. Any suitable message may be used. It will be recognized that if the remote device 102 does not have a display, the caller ID message will not be available to the user.

The controller 110 then controls the display 116 to display optional reply messages, as indicated in block 414. For example, there can be a default message telling the caller that they are on hold and the call will be answered shortly; a recorded message that the called party can not answer soon, but the caller can leave a message (if the phone has an answering circuit 128); a message that the called party is unavailable; a message giving the caller the option to forward the call to another number or to forward the call to a network voice mail service; or any other message that the user wants to save in the memory 126. The controller 110 waits a predetermined time period, such as 1 to 2 seconds, for the user to select a message, in decision block 416. If the user selects a message, the controller 110 recalls the selected message from memory 126 and controls the transmitter to transmit the message, thus generating a message to the caller, in block 418. If the user does not select a message in the predetermined time period, the controller retrieves the default message from memory 126, and controls the transmitter 130 to transmit the message to the caller, thereby generating the default reply to the caller, in block 420. When the controller 110 controls the display 116 to display a menu of choices for the user to select answer in block 414, the controller 110 is responsive to a key input from a key set 118 to select the message to be generated for the calling party. Thus, each of the messages can be associated with a respective number, and the user selects a desired message by actuating a key of key set 118 having the number associated with the desired message.

In block 422, the controller 110 determines whether the caller is identified, which means that a caller identification was transmitted from the base station to the remote device. If the caller was identified, the caller is given an option of having the caller return the call later and ending the call, or being put on hold, in block 424. The user can call the caller back using the callers ID which is temporarily stored in memory 126. For example, the caller is told to press "1" if they want to wait or "2" if they want to leave their number.

It is envisioned that the decision block 422 can be removed if the remote device 102 has an answering circuit 128 or if a network supported voice mail service is available. For example, all callers can be given the option of leaving a message or waiting when the silent answer key 119 is actuated. This option is provided to all callers, not just those having a known number.

If the caller accepts the option provided in block 424, as determined in block 426, the controller 110 exercises the option in block 428 and exits the subroutine to provide call processing as is known. If the device has an answering circuit, the device will automatically ask the caller to leave a message if no action is taken by the user. Thus, the present invention has the advantage of: letting the calling party know that the called party is available to answer the call shortly, and allows the caller to wait momentarily until the user is able to talk in private; or if the user is in a location with very loud background noise levels, until the user is in a quieter area; or if the user is in a cold, rainy or otherwise uncomfortable environment, permits the user to move to a better environment before conversing without losing a call.

If the caller's identification was not known, as determined in block 422, or if the caller wants to wait for the user, as determined in block 426, the controller next starts a timer, as indicated in block 430. The controller 110 then determines if the user accepted the call into an active call state in block 432. If the user is ready to talk, which occurs when the user answers the call by entering the active call state, the controller 110 ends the subroutine. Otherwise, the controller 110 determines if the timer has timed out in decision block 434. If the timer did not time out, the controller 110 determines if the calling party has hung-up, in decision block 436. If the caller has not hung-up, the processor returns to block 432. If the caller did hang up, the controller 110 ends the subroutine 400.

When the timer times out, as determined in decision block 436, the controller 110 generates the message for repeated play to the caller, as indicated in block 438. The controller 110 then returns to block 430, to restart the timer. The controller will repeat the functions of block 430, 432, 434, 436 and 438 until the caller hangs-up or the called party answers the call, thus providing repeated messaging to the caller.

The called party options, the caller ID features, and the caller reply options can be omitted in part, or in total, to reduce the complexity of the subroutine, or if the remote device does not include a display, while still providing a novel silent answer feature and the advantages thereof. It is further envisioned that a detector 135 for detecting whether device 102 is in a silent or audible alert mode can be employed. The controller 110 is responsive to the silent answer key 119 actuation to accept the call and generate a message only if the silent alert is enabled if this optional detector is used.

It is also envisioned that if an answering circuit 128 is provided in the remote device, it can be advantageously engaged by becoming active if the user does not accept the call within a predetermined time period. For example, the time period is equivalent to four rings of a standard ringer on a telephone.

It is envisioned that the silent answer feature of the present invention may be advantageously employed in a remote device having call waiting. Call waiting generates an alerting signal to the user when a second call is incoming to the remote device while the user is in a first active call. The user can push the silent answer key in this situation. Responsive thereto, a message is generated indicating that the called party is occupied, and will be available to answer the call shortly. At the user's convenience, the user answers the second call by actuating the silent answer key 119 again or by actuating a control key of key set 118.

Thus it can be seen that a versatile silent answer system, is disclosed. It allows the user to accept a call without disruption and to delay conversation until the user is ready to talk.

I claim:

1. A portable radiotelephone, comprising:

a housing;

a microphone positioned in said housing;

a speaker positioned in said housing;

a transceiver coupled to the microphone and the speaker, the transceiver positioned in said housing to communicate with a central device;

a display positioned on said housing;

a silent alert generator positioned in said housing to indicate an incoming call;

at least one manually actuated user input positioned on said housing;

a memory positioned in said housing and storing a plurality of predetermined messages one of said predetermined messages being a call answer message, a second one of said predetermined messages being a default message and a third one of said predetermined messages being an optional message; and a controller positioned in said housing and coupled to said user input, said display, said transceiver, and said memory, said controller selectively responsive to actuation of said user input to accept a call during an incoming call alert and generating said call answer message to transmit to a caller indicating that the call has been accepted by the radiotelephone, and said controller controlling said display to display at least one reply message option corresponding to at least said optional message, said controller selectively responsive to a user input during a predetermined time period following display of said at least one reply message option to cause transmission of said optional message to the caller, said controller causing said default message to be transmitted to the caller if a user input is not detected during said predetermined time period, and said controller responsive to a user to selectively answer the call by activating communication between the caller and said microphone and said speaker.

2. The portable radiotelephone as defined in claim 1, further comprising a detector for detecting when the portable radiotelephone is in a silent answer mode and an audible alert mode, said controller responsive to said user input to transmit said call answer message only if the silent answer mode is detected by said detector.

3. The portable radiotelephone as defined in claim 1, wherein said controller is responsive to actuation of said user input when a second call alert is signaled during an active call to accept the second call and generate said call answer message for the second caller indicating that the called party is occupied, and the user selectively answers the second call by actuating said user input.

4. The portable radiotelephone as defined in claim 1, wherein the controller is responsive to a predetermined reply from the caller to store a message associated with the caller and end the call.

5. The portable radiotelephone as defined in claim 1, further including an answering circuit which is activated if the call is not accepted within a predetermined time period following actuation of the at least one manually actuated key.

6. The portable radiotelephone as defined in claim 1, further including a display and a key set, wherein the controller controls the display to generate a menu of choices for the message responsive to actuation of the at least one manually actuated key, and the controller is responsive to actuation of the at least one manually actuated key to select a previously recorded message to be generated for the caller.

7. A method of providing a silent answer in a portable radiotelephone having a housing, the portable radiotelephone having a display, a call alert, a microphone, a speaker, a controller, and a transceiver positioned in said housing, said controller coupled to said call alert, said transceiver, said microphone, said display and said speaker, the method comprising the steps of:

generating an alert in the portable radiotelephone;

detecting, by the controller, inputs from a manually actuated key set;

accepting a call into a nonactive call state upon detecting a predetermined input, wherein in the nonactive call state the controller prevents the microphone and speaker communicating with the transceiver and the controller causes the transmission of a predetermined call accept message to the caller;

controlling the display to display at least one reply message option;

transmitting one of an optional message and a default message to the caller, the optional message transmitted if the controller detects a user input during a predetermined time period following display of the at least one reply message option, and the default message trans mitted to the caller if a user input is not detected by the controller during the predetermined time period; and answering the call by the controller enabling communication between the microphone, the speaker, and the caller, thereby entering an active call state, upon the controller detecting a predetermined input from the user.

8. The method as defined in claim 9, wherein the step of placing the device in an nonactive call state is responsive to an actuation of a silent answer key.

9. A portable radiotelephone, comprising:

a housing ;

a transceiver including a transmitter and a receiver positioned in the housing;

a microphone positioned in said housing;

a speaker positioned in said housing;

an alert generator positioned in said housing generating an alert responsive to an incoming call;

a manually actuated key set;

a memory positioned in said housing storing a predetermined message for transmission when the key set is actuated during the alert;

and a controller positioned in said housing and coupled to the alert generator, the silent answer key, the transceiver, the speaker, the microphone, and the memory, the controller responsive to one predetermined actuation of the key set to answer a call, interrupt the alert generator, not communicate signals from the microphone to the transmitter, not communicate signals to the speaker from the receiver, and generate the predetermined message for a caller, and the controller responsive to an other predetermined actuation of the key set to answer the call by activating communication between the caller and the microphone and the speaker through the transceiver.

* * * * *